Oct. 9, 1945.                 G. A. LYON                 2,386,232
                           WHEEL STRUCTURE
                          Filed June 2, 1943
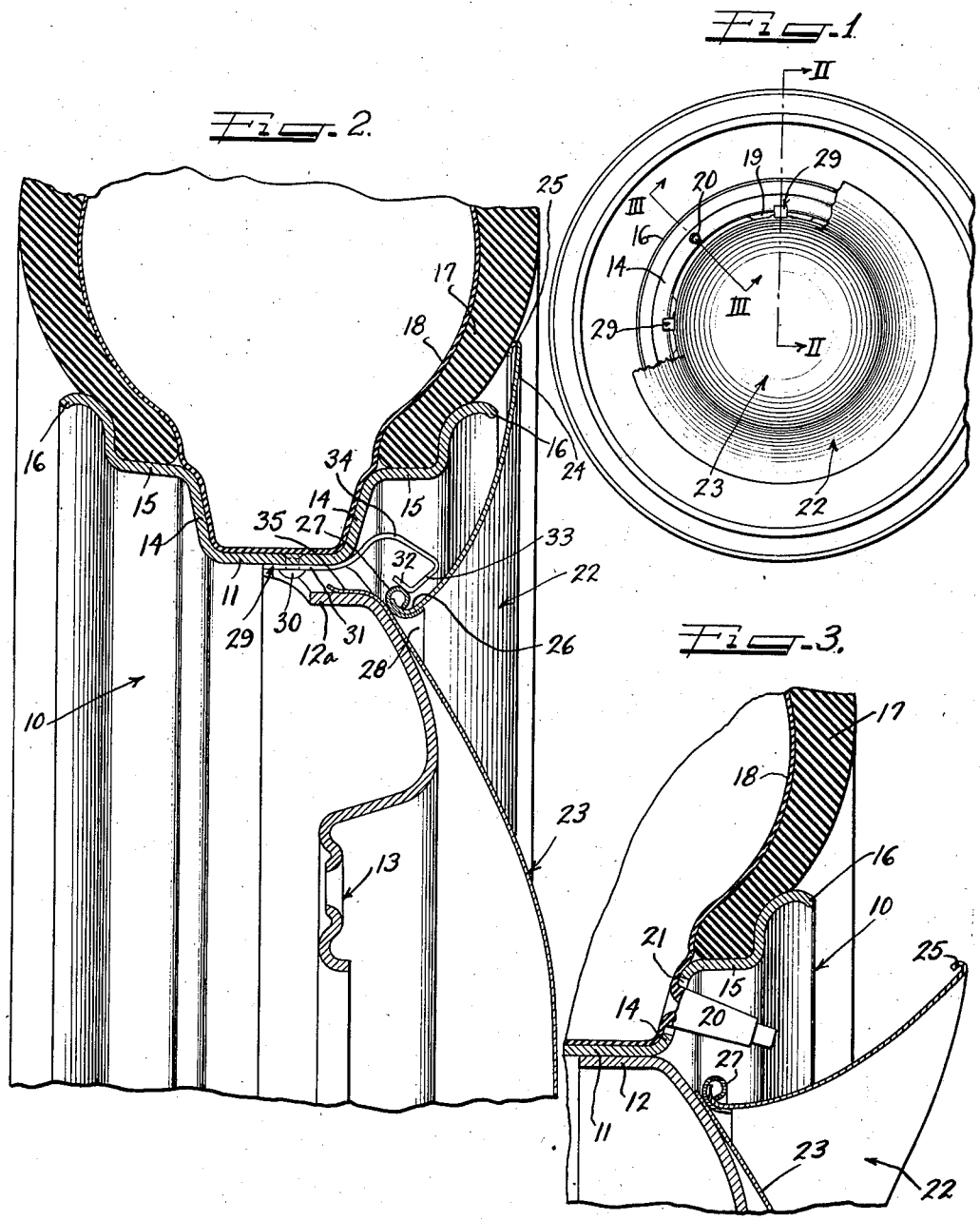
Inventor
GEORGE ALBERT LYON.
by Charles W. Hills
Attys.

Patented Oct. 9, 1945

2,386,232

UNITED STATES PATENT OFFICE 2,386,232

WHEEL STRUCTURE

George Albert Lyon, Allenhurst, N. J.

Application June 2, 1943, Serial No. 489,314

1 Claim. (Cl. 301—37)

This invention is directed to a wheel structure and relates more particularly to an improved cover assembly therefor.

It is an important object of the invention to provide for a wheel structure, a multi-part cover assembly for disposition over the outer side thereof, said cover being provided with a portion having a cross-sectional configuration of such shape and magnitude that it constitutes, in effect, a continuation of the outer side wall of a tire on the wheel structure to give the appearance of being a continuation thereof and to appear as a part thereof, thus to give the appearance of a white side wall of a massive tire mounted on a wheel structure of minimum dimensions, when colored white.

Still another important object of the invention is to provide for a wheel structure a cover assembly including an outer annular portion formed from a resiliently, locally flexible material such as a synthetic plastic or the like and which is of such a character that upon release of flexing forces said portion, by virtue of its own resiliency, flexes back to the intended position on the wheel in self sustaining or maintaining relationship thereto.

Still another object of the invention is to provide for a wheel structure, an improved cover assembly having an improved retaining arrangement whereby the cover assembly is secured to the wheel structure in detachable engagement therewith, the cover being easily and readily attached to the wheel structure.

It is still another object of the invention to provide for a wheel structure, a multi-part cover assembly for disposition over the outer side thereof, said cover assembly including an outer annular part and a central circular portion, the central circular portion having means thereon for maintaining the same in concentric relationship with a central part of the wheel structure and being retained thereon by abutment of another part of the cover thereon, the latter part of the cover being detachably securable to the wheel structure.

Still a further object of the invention is to provide an improved cover assembly for disposition over the outer side of a wheel structure in which a part thereof is formed from a resiliently flexible, self sustaining, form retaining material, said part being constructed to be locally deformed or deflected resiliently away from the wheel structure to render the rear side thereof accessible, there being means provided for retainingly engaging the flexible portion of the cover on the wheel structure, said means being arranged to engage a reinforced part of the cover whereby engagement thereof with the cover will not break the same during retention on a wheel or during the flexure thereof away from the wheel structure. With such a self sustaining cover, it may have a portion thereof secured to the wheel, the remainder retaining its intended position relative to the wheel by virtue of the self sustaining, form retaining characteristics.

In accordance with the general features of the invention there is provided herein a wheel structure having the conventional drop center type tire rim and having a central load bearing part joined thereto with circumferentially spaced apertures at the junction of the parts. There is also provided a cover assembly including a central hub cap simulating part provided with axially inwardly extending fingers for engaging in the circumferentially spaced apertures at the junction of the wheel parts to retain said cover member in concentric relation over the central part of the wheel, there being an annular, outer, resiliently flexible cover member arranged to engage retaining means on the wheel structure to be drawn axially inwardly against the central load bearing portion to press against the central cover member to retain the same on the wheel, the radially inner peripheral portion of the annular cover member being suitably reinforced at the part thereof which engages the retaining means and extending radially outwardly, preferably to conceal the junction between the edge portion of the tire rim and a tire therein.

Other objects and advantages of the invention will become apparent from the following description and accompanying drawing in which:

Figure 1 is a fragmentary side elevation of a wheel showing an embodiment of my invention with parts broken away for illustrative purposes;

Figure 2 is a fragmentatry cross-sectional view taken on the line II—II of Figure 1; and Figure 3 is a fragmentary cross-sectional view taken substantially along the line III—III of Figure 1, a portion of the cover being shown in flexed position for illustrative purposes.

As shown in the drawing, particularly Figure 1, the wheel structure includes a tire rim of the drop center type having a base flange 11 which is secured by welding or rivcting or the like to an axially inwardly extending flange 12 of a central load bearing portion having a bolt on flange 13. The tire rim is further provided with opposite side wall portions 14, opposite intermediate flanges 15 and edge portions 16 in which are disposed a suitable tire 17 having an inner tube 18.

As will be seen from Figures 1 and 2 the flange 12 of the central load bearing portion is provided with depressed portions 12a which afford circumferentially spaced apertures 19 at the junction of the central load bearing portion with the tire rim 10.

As shown in Figures 1 and 3, the inner tube 18 of the tire 17 is provided with a valve stem 20 which projects through an aperture 21 in one of the side wall portions 14 of the tire rim 10.

In the cover assembly disclosed herein there is provided an outer annular portion 22 and a central circular, hub cap simulating portion 23, each of which is formed from sheet material, the outer annular portion 22 being formed preferably from a resiliently, locally flexible material such as a synthetic plastic or the like, whereby it may be flexed locally from the outer periphery thereof as shown in Figure 3 to provide access to the rear side thereof so that wheel balancing weights, the tire valve stem 20, or other appurtenances may be rendered accessible and further, so that the inner peripheral portion thereof may be pried away from suitable retention means to be described presently. As indicated previously, a suitable material from which the cover member 22 may be formed is synthetic plastic sheet stock or the like. Such material is further advantageous in that a permanent white may be imparted thereto, whereby the assembly may be maintained free from discoloration by dirt, mud or the like, merely by the pressure of water delivered from a hose which may be played thereon.

As shown in Figure 2 the outer peripheral margin 24 of the cover part 22 may extend radially outwardly beyond the junction between the tire 17 and the edge portion 16 of the tire rim, thereby to conceal the junction and provide for the outer side of the wheel structure a continuation of the side wall of the tire to give the appearance of a massive tire having a white side wall mounted upon a central load bearing structure of minimum dimensions. The radially outer edge of the cover member 22 is turned back as at 25 to present to the side wall of the tire a smooth surface, thus to eliminate abrasion or wear on the side wall of the tire under circumstances to be described presently.

It will be understood that upon operation of the wheel structure under load bearing conditions, the side walls of the tire 17 extend laterally as they reach a lowermost position due to the load impressed thereon. Under these circumstances, it will be seen that the cover construction provided herein is such that the cover part 22 will be free to flex laterally with this expanded portion of the side wall of the tire and will breathe therewith to immediately return with the tire to the normal position shown in Figure 2, when the load is released therefrom as the tire part continues to rotate upwardly. Thus, it will be seen that while the cover part 22 extends beyond the radially outer extremity of the wheel structure and against the side wall of the tire, it will not be destroyed by this movement of the tire, since it is free to flex locally to breathe therewith. Furthermore, the rounded or smooth surface presented by the turned back portion 25 effectively prevents abrasion and wear of the tire at the point engaged thereby.

As indicated previously, the material from which the cover member 22 is constructed is susceptible of splitting when stresses and forces are imposed thereon during use.

To the end that this splitting may be avoided there is provided herein, at the inner peripheral part 26 of the cover part 22, a bead 27 which, in the present instance, is shown in the form of an annulus curled around the edge thereof. This annulus or bead may be formed from any suitable material, preferably stronger or more rigid than the cover and, if desired, may include an outwardly extending flange portion 28 which, if the bead is of metal, may be provided with a high luster or may be enamelled to appear any desirable color.

To the end that the cover member 22 may be securely maintained upon the wheel structure in detachable relationship thereto, there is provided herein a plurality of spring clips 29 which may be riveted to the radially inner surface of the base flange 11 of the tire rim as at 30. Preferably each of these clips 29 is provided with an axially inwardly extending arm 31 which is disposed against the radially inner surface of the base flange 11 at points adjacent the circumferentially spaced apertures 19 in the wheel structure. The clips are provided with axially outwardly extending cover retaining portions including terminal, obliquely disposed, axially inwardly extending fingers 32, obliquely disposed, axially outwardly extending portions 33 and intermediate portions 34 which connect the latter with the respective arm 31. Thus it will be seen that the spring clips, being resilient, will receive the bead 27 of the cover member 22 in retaining engagement upon axial inward movement thereof by virtue of resilient, radially outward movement of the retaining portions, the terminal fingers 32 coming to rest against the bead 27 to retain the same axially inwardly against the body part or central load bearing portion of the wheel structure. It will be understood, of course, that many suitable expedients may be utilized in securing the spring clips 29 to the wheel structure.

From the foregoing it will be seen that axial inward movement of the cover portion 22 results in resilient displacement of the axially outer portions of the spring clips, the latter coming to rest against the bead 27 upon continued inward movement of the cover member 22, whereby the latter is securely retained in compressed engagement upon the wheel structure against the central load bearing portion thereof.

As will be seen from Figures 2 and 3, the central circular cover portion 23 which may be formed from a sheet plastic, or from any other suitable sheet material, is provided with circumferentially spaced peripheral fingers 35 which extend axially inwardly and are arranged for registry with the apertures 19 in the wheel structure, thereby to overlie the radially outer surface of the depressed portions 12a of the flange of the central load bearing portion. With such a construction it will be seen that axial inward movement of the cover member 23 relative to the wheel structure will result in the fingers 35 being disposed in the position shown in Figure 2, thereby to align the cover portion 23 centrally with respect to the wheel structure. Thereafter the outer cover member 22 may be disposed in retained relationship with the wheel structure in the manner previously described, whereby the clips 29 resiliently urge the inner peripheral part thereof axially inwardly toward the wheel structure to retain the cover part 23 in sandwiched relationship between the wheel structure and the bead 27 thereon. Thus it will be seen that the entire multi-part cover assembly is readily retained upon the wheel structure merely by virtue of the engagement between the retaining fingers 29 and the outer annular cover part 22.

It will be understood that if the central cover portion 23 is formed from synthetic plastic sheet stock, then the portion thereof which is abutted by the bead 27 of the cover portion 22 serves as a cushion whereby the development of vibration and rattle between the various parts of the wheel structure and the cover member is prevented, thus to provide a more efficient assembly.

From the foregoing it will be seen that I have provided herein an improved and novel cover assembly in which a portion thereof extends radially outwardly over the outer side of the tire rim to conceal the same and, if desired, radially outwardly a sufficient extent to conceal the junction between the tire rim and the tire, thereby to constitute, in effect, a continuation of the side wall of the tire to give the appearance of being a part thereof and to give the appearance of a massive tire mounted on a wheel structure of minimum dimension, this radially outwardly extending cover part being so constructed and arranged as to be locally flexed outwardly to render the rear side thereof accessible for removal thereof from the wheel and for servicing of the tire valve stem and wheel balancing weights or the like.

Furthermore, there is provided herein a novel cover assembly in that the outer annular part is rigidified at the inner periphery thereof. This is important in view of the fact that the annular cover part 22 is maintained upon the wheel structure by engagement of retaining means at circumferentially spaced points. It will be seen that by rigidifying the inner peripheral part of the cover 22, as by the bead 27, retention and compression of the cover 22 axially inwardly toward the body part of the wheel will result in this compression not only at the point thereof aligned with the resilient fingers 29 but also at intermediate points such as that shown in Figure 3. Thus the cover member 23 is retained on the wheel structure by a circular or annular region of pressure rather than by a plurality of points of pressure.

What I claim is:

In a wheel structure including a tire rim, a cover member for disposition over the outer side of said tire rim, said cover member being in the form of an annulus and being arranged to be resiliently, locally flexed away from the wheel structure to render the rear side thereof accessible and having a cross-sectional configuration of such shape and magnitude that it overlies the outer side of the tire rim to conceal the same and constitutes in effect a continuation of the side wall of a tire in said rim to give the appearance of being a part thereof, means for reinforcing the inner peripheral portion of the cover member, said means comprising a cross-sectionally, substantially circular reinforcing member arranged to envelop the inner peripheral margin of said cover and retaining means on the wheel structure for retainingly engaging said reinforced portion of the cover and for resiliently urging the same toward the adjacent portion of the outer surface of the wheel structure thereby to afford a pivotable connection between the retaining means, the wheel structure and the reinforced portion of the cover to provide for free, local flexure of the cover by movement of a portion of the outer peripheral edge thereof away from the wheel structure to render the rear side thereof accessible.

GEORGE ALBERT LYON.